United States Patent
Lesot et al.

(10) Patent No.: US 8,024,716 B2
(45) Date of Patent: Sep. 20, 2011

(54) METHOD AND APPARATUS FOR CODE OPTIMIZATION

(75) Inventors: Jean-Philippe Lesot, Etrelles (FR); Mikael Peltier, Bourg-des-Comptes (FR); Gilbert Cabillic, Brece (FR)

(73) Assignee: Texas Instruments Incorporated, Dallas, TX (US)

( * ) Notice: Subject to any disclaimer, the term of this patent is extended or adjusted under 35 U.S.C. 154(b) by 921 days.

(21) Appl. No.: 11/189,211

(22) Filed: Jul. 26, 2005

(65) Prior Publication Data

US 2006/0026574 A1 Feb. 2, 2006

(30) Foreign Application Priority Data

Jul. 27, 2004 (EP) ..................................... 04291918

(51) Int. Cl.
  *G06F 9/45* (2006.01)
(52) U.S. Cl. ........................ 717/148; 717/153
(58) Field of Classification Search .................. 717/146, 717/148, 158, 151–153
See application file for complete search history.

(56) References Cited

U.S. PATENT DOCUMENTS

| | | | | |
|---|---|---|---|---|
| 5,774,737 A * | 6/1998 | Nakano | ........................... | 712/24 |
| 5,842,017 A * | 11/1998 | Hookway et al. | ............. | 717/158 |
| 5,950,007 A | 9/1999 | Nishiyama et al. | | |
| 5,999,732 A * | 12/1999 | Bak et al. | ....................... | 717/148 |
| 6,078,744 A | 6/2000 | Wolczko et al. | | |
| 6,081,665 A * | 6/2000 | Nilsen et al. | .................... | 717/116 |
| 6,530,075 B1 * | 3/2003 | Beadle et al. | ................... | 717/114 |
| 6,745,384 B1 | 6/2004 | Biggerstaff | | |
| 7,000,227 B1 | 2/2006 | Henry | | |
| 7,017,154 B2 | 3/2006 | Haber et al. | | |
| 7,146,607 B2 * | 12/2006 | Nair et al. | ...................... | 717/151 |
| 7,152,223 B1 * | 12/2006 | Brumme et al. | .............. | 717/116 |
| 7,185,330 B1 | 2/2007 | Khu | | |
| 7,194,736 B2 * | 3/2007 | Shi et al. | ........................ | 717/153 |
| 2003/0093780 A1 * | 5/2003 | Freudenberger et al. | ..... | 717/153 |
| 2004/0024989 A1 * | 2/2004 | Chauvel et al. | .................. | 712/41 |
| 2004/0054994 A1 * | 3/2004 | Demsey et al. | ............... | 717/148 |
| 2004/0078550 A1 * | 4/2004 | Chauvel et al. | .................. | 712/34 |
| 2004/0083467 A1 * | 4/2004 | Hanley et al. | .................. | 717/148 |
| 2004/0221281 A1 * | 11/2004 | Suganuma | ...................... | 717/151 |
| 2004/0236927 A1 * | 11/2004 | Irie et al. | ........................ | 712/209 |
| 2005/0028132 A1 * | 2/2005 | Srinivasamurthy et al. | .. | 717/100 |

OTHER PUBLICATIONS

Lee, et al., "A Declarative Approach to Run-Time Code Generation"; Carnegie Mellon University, 1996.*
Leone, et al., "Lightweight Run-Time Code Generation"; ACM SIGPLAN, 1994.*
Yeung et al., "Dynamic Instrumentation for Java Using a Virtual JVM", Imperial College, UK, 2002.*

(Continued)

*Primary Examiner* — Li Zhen
*Assistant Examiner* — Ryan Coyer
(74) *Attorney, Agent, or Firm* — Ronald O. Neerings; Wade James Brady, III; Frederick J. Telecky, Jr.

(57) ABSTRACT

A system comprising a compiler that compiles source-level code to generate an intermediate-level instruction comprising a predetermined component. The intermediate-level instruction is an at least partially optimized version of the source-level code. Execution of the predetermined component triggers the execution of a series of instructions that, when executed, generates previously-unavailable data that is used to re-generate the intermediate-level instruction. The re-generated intermediate-level instruction has a length less than or equal to that of the intermediate-level instruction.

19 Claims, 6 Drawing Sheets

OTHER PUBLICATIONS

Leone, et al., "Lightweight Run-Time Code Generation"; ACM SIGPLAN, 1994.*

Calder, et al., "Value Profiling and Optimization", Journal of Instruction-Level Parallelism, Mar. 1999, pp. 1-33.

Childers, et al., "Continuous Compilation: A New Approach to Aggressive and Adaptive Code Transformation", Proceedings of the International Parallel and Distributed Processing Symposium, 2003, pp. 1-10.

* cited by examiner

| R0  | GENERAL PURPOSE (GP) |
| --- | --- |
| R1  | GENERAL PURPOSE (GP) |
| R2  | GENERAL PURPOSE (GP) |
| R3  | GENERAL PURPOSE (GP) |
| R4  | GENERAL PURPOSE (GP) |
| R5  | GENERAL PURPOSE/LOCAL VARIABLE POINTER (LV) |
| R6  | STACK POINTER (SP) |
| R7  | TOP OF STACK (ToS) |
| R8  | GENERAL PURPOSE (GP) |
| R9  | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

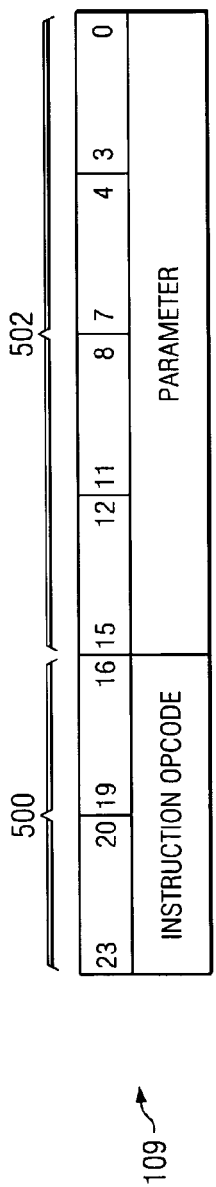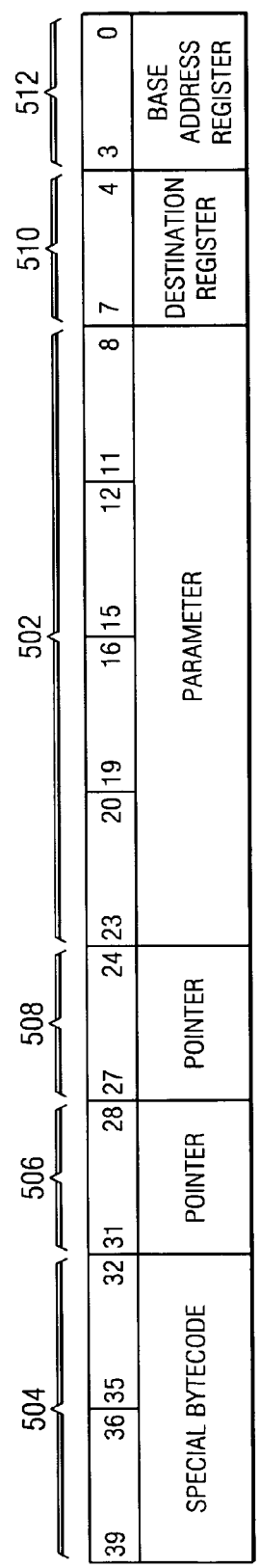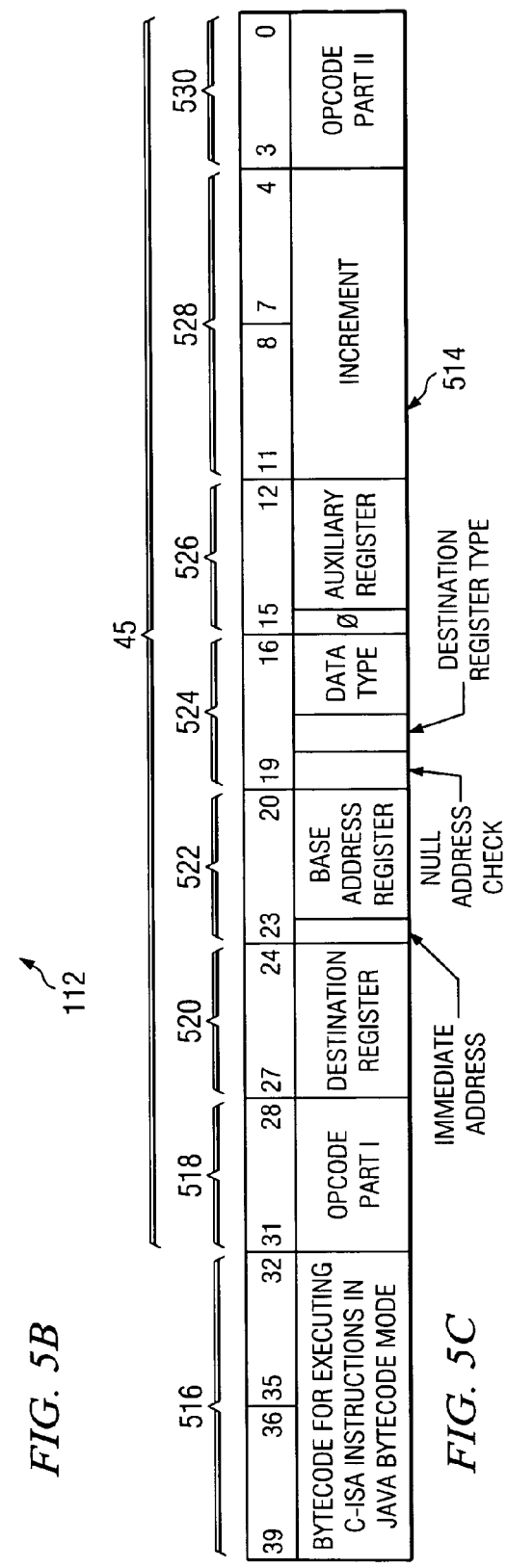

METHOD AND APPARATUS FOR CODE OPTIMIZATION

CROSS-REFERENCE TO RELATED APPLICATIONS

This application claims priority to European Patent Application No. 04291918.3, filed on Jul. 27, 2004 and incorporated herein by reference.

BACKGROUND

Compilers in Java™ systems often are used to optimize code such that the optimized code is executed with greater efficiency (e.g., in less time or consuming less power) than non-optimized code. In order to fully and completely optimize code, an online compiler requires specific information pertaining to the code. For instance, the specific information may pertain to other classes (by way of a constant pool) used by the code. This specific information is used to place the already-optimized code into a finalized format, thus fully and properly completing the optimization process. For any of a variety of reasons, however, this specific information is often unavailable to the compiler when the specific information is needed. Because the specific information is required by the compiler in order to place optimized code into a complete, finalized format, and further because this specific information is unavailable to the compiler, the compiler is unable to optimize the code at all. Similar problems also may be encountered in non-Java systems.

SUMMARY

Disclosed herein is a technique by which a compiler optimizes source-level code to generate intermediate-level code, and by which the compiler also incorporates a special instruction into the optimized, intermediate-level code. When executed, the special instruction causes the optimized, intermediate-level code to be re-generated into a finalized format, thus fully and properly completing the optimization process. An illustrative embodiment of the invention is a system comprising a compiler that compiles source-level code to generate an intermediate-level instruction comprising a predetermined component. The intermediate-level instruction is an at least partially optimized version of the source-level code. Execution of the predetermined component triggers the execution of a series of instructions that, when executed, generates previously-unavailable data that is used to re-generate the intermediate-level instruction. The re-generated intermediate-level instruction has a length less than or equal to that of the intermediate-level instruction.

Another illustrative embodiment is a processor comprising a fetch logic that fetches from storage compiled code comprising a predetermined instruction, the compiled code a compiled, at least partially optimized version of source-level code. The processor also comprises a decode logic coupled to the fetch logic that decodes compiled code. Upon decoding the predetermined instruction, the decode logic triggers execution of a group of instructions that, when executed, re-generates the compiled code.

Yet another illustrative embodiment is a computer-implemented method that comprises compiling source-level code to generate an at least partially optimized intermediate-level code comprising a predetermined instruction, presenting the predetermined instruction of the intermediate-level code to a decoder of a processor, and triggering by the processor, based on the predetermined instruction, the execution of a group of instructions. When executed by a processor, the group of instructions causes the processor to generate data unavailable during compilation. The data is used to re-generate the intermediate-level code.

Still another embodiment comprises a computer-readable medium storing a program that, when executed, performs a method that comprises incorporating a predetermined instruction into intermediate-level code generated by compiling source-level code, where the intermediate-level code is an at least partially optimized version of the source-level code. The method also comprises executing a group of instructions triggered by decoding the predetermined instruction, where execution of the group of instructions generates a datum unavailable during compilation. The datum is used to re-generate the intermediate-level code.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIGS. 5a-5c show various stages of code compilation and optimization, in accordance with embodiments of the invention;

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a technique by which a compiler optimizes source-level code to generate intermediate-level code, and by which the compiler also incorporates a special Bytecode instruction into the optimized, intermediate-level code. When decoded and executed by a processor, the special Bytecode causes the processor to obtain the previously unavailable, specific information needed to fully complete the optimization process. The processor then uses the specific information to re-generate the optimized code into a usable, finalized format.

The processor described herein is particularly suited for executing Java™ Bytecodes or comparable code. Java is a stack-based language, meaning that a processor stack is heavily used when executing various instructions (e.g., Bytecodes), which instructions have a size of 8 bits. For example, an integer add ("IADD") Java instruction pops two integers off the top of the stack, adds them together, and pushes the sum back on the stack. Java is a relatively "dense" language meaning that on average each instruction may perform a large number of functions compared to various other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 1:
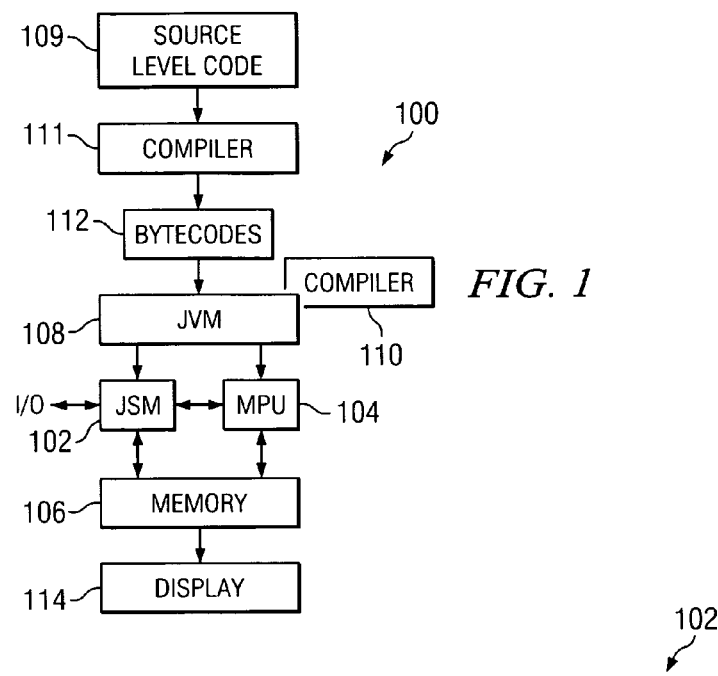
FIG. 1 shows a diagram of a system in accordance with preferred embodiments of the invention and including a Java Stack Machine ("JSM") and a Main Processor Unit ("MPU"), in accordance with embodiments of the invention.

Referring now to FIG. 1, a system 100 is shown in accordance with preferred embodiments of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, compiler 111, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

Java code comprises a plurality of "Bytecodes" 112. Bytecodes 112 are generated by compiling source-level code 109 using the compiler 111. Bytecodes 112 may be provided to the JVM 108, compiled by compiler 110 and provided to the JSM 102 and/or MPU 104 for execution therein. In accordance with embodiments of the invention, the JSM 102 may execute at least some of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with embodiments of the invention, the JSM 102 may execute at least two types of instruction sets. One type of instruction set may comprise Java Bytecodes. A "simple" Bytecode instruction is one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, the execution of one or more of the complex Bytecodes may be replaced by the execution of a "micro-sequence" comprising various other instructions.

Another type of instruction set executed by the JSM 102 may include instructions other than Java instructions. In accordance with at least some embodiments of the invention, the other instruction set may include register-based and memory-based operations. This other type of instruction set complements the Java instruction set and, accordingly, may be referred to as a complementary instruction set architecture ("C-ISA"). By complementary, it is meant that the execution of a complex Java Bytecode may be replaced by the execution of a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 comprises a stack-based architecture for efficient and accelerated execution of Java Bytecodes combined with a register-based architecture for executing register and memory based C-ISA instructions. Because various of the data structures described herein are JVM-dependent and thus may change from one JVM implementation to another, the software flexibility of the micro-sequence provides a mechanism for various JVM optimizations now known or later developed.

Figure 2:
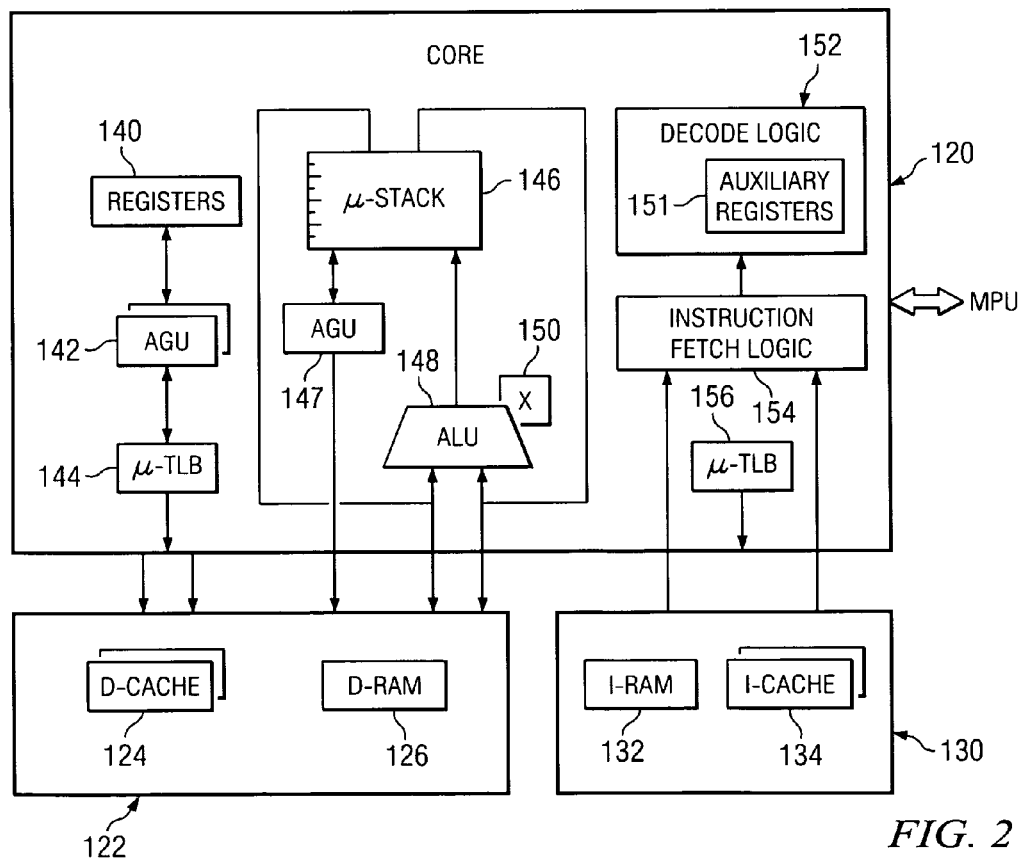
FIG. 2 shows a block diagram of the JSM of FIG. 1 in accordance with embodiments of the invention.

FIG. 2 shows an exemplary block diagram of the JSM 102. As shown, the JSM includes a core 120 coupled to data storage 122 and instruction storage 130. The core may include one or more components as shown. Such components preferably include a plurality of registers 140, two or more address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. Operands may be retrieved from data storage 122 or from the micro-stack 146 and processed by the ALU 148, while instructions may be fetched from instruction storage 130 by fetch logic 154 and decoded by decode logic 152.

Immediate operands may be fetched from the instruction storage 130, since immediate operands are grouped with corresponding instructions in the instruction code. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151.

Figures 3, 4:
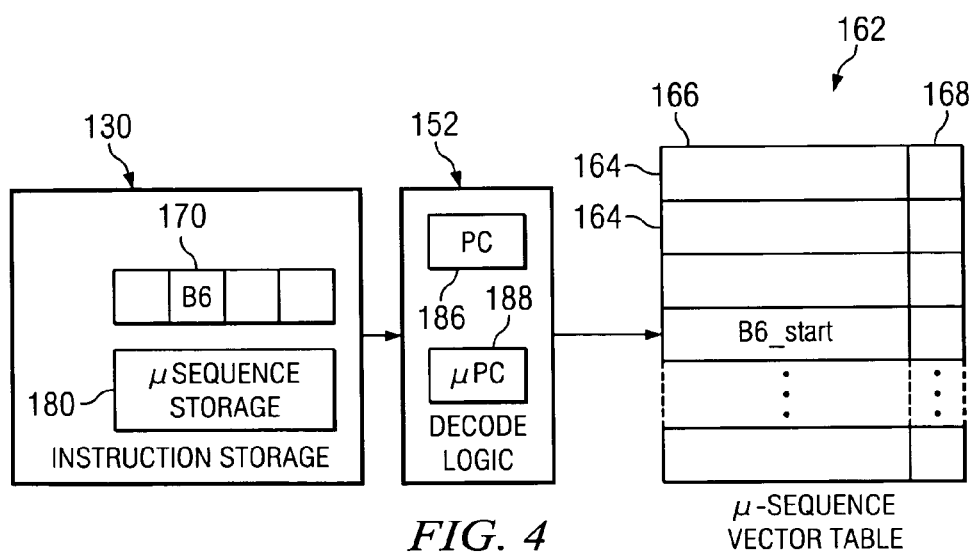
FIG. 3 shows various registers used in the JSM of FIGS. 1 and 2, in accordance with embodiments of the invention.
FIG. 4 shows the operation of the JSM to execute "microsequences," in accordance with embodiments of the invention.

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7. The top of the micro-stack 146 has a matching address in external memory pointed to by register R6. The values contained in the micro-stack 146 are the latest updated values, while their corresponding values in external memory may or may not be up to date. Register R7 provides the data value stored at the top of the micro-stack 146. Register R15 may be used for status and control of the JSM 102. At least one bit (called the "Micro-Sequence-Active" bit) in status register R15 is used to indicate whether the JSM 102 is executing a simple instruction or a complex instruction through a micro-sequence. This bit controls, in particular, which program counter is used (PC or µPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). As mentioned above, Java Bytecodes are stack-based procedures that, in some embodiments, utilize the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as described below. The I-cache 134 may be used to store other types of Java Bytecode and mixed Java/C-ISA instructions.

As noted above, the C-ISA instructions complement the Java Bytecodes. For example, the compiler 110 may scan a series of Java Bytecodes 112 and replace the execution of a complex Bytecode with the execution of a micro-sequence, as explained below. The micro-sequence may be created to optimize the function(s) performed by the replaced complex Bytecodes.

FIG. 4 illustrates the operation of the JSM 102 to replace the execution of Java Bytecodes with the execution of micro-sequence instructions. FIG. 4 shows some, but not necessarily all, components of the JSM. In particular, the instruction storage 130, the decode logic 152, and a micro-sequence vector table 162 are shown. The decode logic 152 receives instructions from the instruction storage 130 and accesses the micro-sequence vector table 162. The decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces the execution of a Bytecode from instructions 170 with the execution of a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. Field 168 may comprise a single bit that indicates whether the instruction 170 is to be directly executed or whether the associated field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the associated field 166 contains a reference to a micro-sequence.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the execution of the Bytecode is to be replaced by the execution of a micro-sequence. If the bit 168 indicates that the Bytecode can be directly processed and executed by the JSM, then the instruction is so executed. If, however, the bit 168 indicates that the execution of the Bytecode is to be replaced by the execution of a micro-sequence, then the decode logic 152 preferably changes this instruction into a "no operation" (NOP) and sets the micro-sequence-active bit (described above in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters—the PC and the μPC. The PC and the μPC are stored in auxiliary registers 151, which in turn is stored in the decode logic 152. In accordance with a preferred embodiment, one of these two program counters is the active program counter used to fetch and decode instructions. The PC 186 may be the currently active program counter when the decode logic 152 encounters a Bytecode, the execution of which is to be replaced by the execution of a micro-sequence. Setting the status register's micro-sequence-active bit causes the micro-program counter 188 to become the active program counter instead of the program counter 186. Also, the contents of the field 166 associated with the micro-sequenced Bytecode preferably are loaded into the μPC 188. At this point, the JSM 102 is ready to begin fetching and decoding the instructions comprising the micro-sequence. At or about the time the decode logic begins using the μPC 188, the PC 186 preferably is incremented by a suitable value to point the PC 186 to the next instruction following the Bytecode whose execution is replaced by that of the micro-sequence. In at least some embodiments, the micro-sequence-active bit within the status register R15 may only be changed when the first instruction of the micro-sequence enters the execute phase of JSM 102 pipe. The switch from PC 186 to the μPC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the μPC 188 to the PC 186 upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the μPC 188 to the PC 186 is performed immediately after the instruction is decoded and the instruction after the RtuS instruction is the instruction pointed to by the address present in the PC 186.

As discussed above, the execution of one or more Bytecodes may be replaced with the execution of a micro-sequence or a group of other instructions. Such replacement instructions may comprise any suitable instructions for the particular application and situation at hand. At least some such suitable instructions are disclosed in U.S. Ser. No. 10/631,308 (Publication No. 20040024989), filed Jul. 31, 2003 and incorporated herein by reference.

Referring again to FIG. 1, source-level code 109 is compiled by the compiler 111 to produce intermediate-level code, which intermediate code comprises one or more Bytecodes 112 as well as one or more parameters associated with the Bytecode(s) 112 (e.g., an intermediate instruction). The intermediate-level code generated by the compiler 111 is a compiled, optimized version of the source-level code 109. An illustrative embodiment of an intermediate instruction is shown in FIG. 5a. An intermediate instruction of produced from the source-level code 109 may comprise 24 bits, although the scope of disclosure is not limited as such, and any number of bits may be used. The intermediate instruction comprises an instruction operation code (opcode) 500 and one or more parameters 502. The instruction opcode 500, which in this illustrative example comprises bits 23:16, may be a bytecode such as a GETFIELD bytecode. The parameter 502, which in this illustrative example comprises bits 15:0, may contain parameters that are associated with the instruction opcode 500. The parameter 502 may represent an index for a Java constant pool, which is a table of structures representing various string constants, class and interface names, field names, variable names and types, and so forth. In some embodiments, the parameter 502 contains a pointer to a variable whose value is used to compute data not computable at compilation. In some embodiments, other specific information that is necessary may be missing. For instance, in the example of the GETFIELD opcode, the relative location of the field (i.e., indicated by parameter 528 in FIG. 5c, described below) may be missing or unavailable at the time when it is needed for optimization of the intermediate instruction. Thus, specific information needed to optimize an intermediate instruction is unavailable, and because this specific information is unavailable, the compiler 111 optimizes the intermediate instruction by replacing it with a special instruction as described herein.

The compiler 111 compiles the source-level code 109 to produce, in some cases, intermediate-level code. The intermediate-level code is an optimized version of the source-level code. In accordance with preferred embodiments of the invention, the compiler optimizes one or more intermediate instructions for which parameter information may not be available at compile time by replacing them with special instructions that are processed when optimized code is executed. An illustrative embodiment of the intermediate level code special instruction is shown in FIG. 5b. The special instruction shown in FIG. 5b preferably comprises 40 bits for instruction, though other widths are contemplated. The size of the special instruction preferably is the same size, or larger than, the size of the final cede instruction 514, described further below. In the illustrative case of FIG. 5b, bits 39:32 contain the special Bytecode 504 which, when executed by a processor, triggers the execution of a series of C-ISA instructions (e.g., a micro-sequence) that replaces the special instruction with a final instruction 514, as described below.

The special Bytecode 504 preferably comprises a single, 8-bit Bytecode that is not used elsewhere in the system 100. The special instruction also comprises a pointer 506 in bits 31:28. The pointer 506 points either directly or indirectly to a computation function that is used as described further below. The special instruction further comprises a pointer 508 in bits 27:24. Pointer 508 points, directly or indirectly, to a function that rewrites the intermediate-level code as described further below. Bits 23:8 are reserved for the parameter 502, which parameter 502 comprises data that, in turn, is used to compute data not computable at compilation. Bits 7:4 represent a destination register 510 for data stores and bits 3:0 represent a base address register 512 for data loads associated with the final instruction The bits 7:0 are generated by the compiler 111.

Once generated by the compiler 111, the special instruction (e.g., the special Bytecode 504 and associated bits 31:0) is transferred to the JVM 108. In some embodiments, the JVM 108 further compiles the special instruction using compiler 110. Also, in some embodiments, the special Bytecode 504 remains unmolested by the compiler 110. In other embodiments, such as during execution, the special Bytecode 504 may be further compiled and/or optimized by the compiler 110. In the GETFIELD example, the compiler 110 may change the destination register in parameter 510 and/or the base address register in parameter 512 if the compiler 110 makes a new and/or more efficient register allocation. Further, in at least some embodiments, the JVM 108 may be hard-wired to identify the special Bytecode 504 when the special Bytecode 504 is presented to the JVM 108. When the JVM 108 receives the special Bytecode 504, the JVM 108 executing on the MPU 104 may generate a series of C-ISA instructions (i.e., a micro-sequence). This micro-sequence then may be stored in the micro-sequence storage 180. In other embodiments, the entire intermediate-level code passes through the JVM 108 unmolested. In any case, the special instruction preferably is transferred from the JVM 108 to the JSM 102 for execution, although the MPU 104 or the JVM 108 also may be used to execute the special instruction and/or other code (e.g., the C-ISA instructions).

Referring somewhat simultaneously to FIGS. 2, 4 and 5c, when the special instruction is received in the JSM 102, the JSM 102 may process the special instruction in a plurality of ways. In at least some embodiments, the decode logic 152 of the JSM 102 attempts to match the special Bytecode 504 of the special instruction to an entry 164 in the micro-sequence vector table 162, in the manner previously described. In the event that a proper, matching entry 164 is found, a micro-sequence corresponding to that entry 164 is loaded from the micro-sequence storage 180 to be executed by the JSM 102. In some cases, this micro-sequence may be hard-coded into the micro-sequence storage 180. In other cases, this micro-sequence may be the same micro-sequence mentioned above that was generated by the JVM 108 and stored to the micro-sequence storage 180. In alternate embodiments where the micro-sequence vector table 162 is not used to locate a micro-sequence for the special Bytecode 504, the decode logic 152 is hard-wired to identify the special Bytecode 504. Upon identifying the special Bytecode 504, the decode logic 152 begins processing of a micro-sequence that corresponds to the special Bytecode 504, which micro-sequence may be generated by the JVM 108 or hard-coded into the JSM 102.

Regardless of the manner in which the micro-sequence is obtained, when executed, the micro-sequence performs the same function. In particular, when executed, the micro-sequence causes the JSM 102 to re-write the special instruction by removing the special Bytecode 504 from the instruction and re-generating the instruction to produce a final instruction that replaces the special instruction. When executed, the micro-sequence causes the JSM 102 to locate and retrieve the aforementioned computation function using pointer 506. The JSM 102 applies the computation function to the parameter 502 to obtain an intermediate parameter (not specifically shown). The JSM 102 uses the pointer 508 to obtain the previously-mentioned function which overwrites the special instruction with the final instruction 514 by using the intermediate parameter, the destination register 510 and the base address register 512. The scope of disclosure is not limited to strictly using these parameters. The number and types of parameters used may vary. Calculating the function using these parameters produces a final instruction 514. Thus, executing the micro-sequence causes the JSM 102 to re-write the special instruction into the final instruction 514 shown in FIG. 5c, while removing the special Bytecode 504 in the process. The final instruction 514 in FIG. 5c is the finalized, usable version of the special instruction in FIG. 5b.

Final instruction 514 comprises 40 bits and preferably is in C-ISA format. Parameter 516, which comprises bits 39:32, preferably comprises a Bytecode which enables the JSM 102 to execute one or more C-ISA instructions in Java Bytecode mode. The remainder of the final instruction 514 (i.e., bits 31:0) comprises a final C-ISA instruction 45. In particular, parameter 518, which corresponds to bits 31:28, as well as parameter 530, which corresponds to bits 3:0, preferably comprise an opcode of the C-ISA instruction 45. The parameter 518 preferably comprises one portion of the opcode (thus labeled "Opcode Part I" on FIG. 5c) and the parameter 530 preferably comprises another portion of the opcode (thus labeled "Opcode Part II" on FIG. 5c). In the GETFIELD example described above, these parameters preferably comprise a load-from-memory instruction. Parameter 520, which corresponds to bits 27:24, preferably comprises a destination register coded over 4 bits. The destination register in parameter 520 corresponds to the destination register in parameter 510 of FIG. 5b. Parameter 522 corresponds to bits 23:20. Bit 23 is set (e.g., asserted) when immediate addressing is to be used in conjunction with parameter 528, as described further below. Bit 23 is not set (e.g., unasserted) when immediate addressing is not to be used. In the GETFIELD example previously described, immediate addressing preferably is used. Bits 22:20 of parameter 522 preferably comprise a base address register to be used for addressing in the instruction 514. The base address register in parameter 522 corresponds to the base address register in parameter 512 of FIG. 5b.

Parameter 524 corresponds to bits 19:16. Bit 19 indicates whether a null address check is to be performed. In some embodiments, an asserted bit 19 indicates that the null address check is to be performed, and an unasserted bit 19 indicates that the null address check is not to be performed, although the scope of disclosure is not limited to assigning bits as such. In the GETFIELD example above, the bit 19 preferably is asserted. Bit 18 indicates a destination register type. In at least some embodiments, an asserted bit 18 indicates that an auxiliary register 151 is to be used, whereas an unasserted bit 18 indicates that a register 140 is to be used. In the GETFIELD example, a register 140 preferably is used. Bits 17:16 indicates a data type. A "0" in bits 17:16 indicates a data byte, a "1" indicates a data short (e.g., half-word), and a "2" indicates a data word. In the GETFIELD example, these bits may be generated in any of a variety of ways, including using the intermediate parameter (not specifically shown) or the pointer 508. Parameter 526 is coded using bits 15:12. Bit 15 preferably is an unused bit, and thus the status of the bit 15 preferably is irrelevant. Bits 14:12 indicates an auxiliary register 151 and is used for post-increments. Bits 14:12 are used in the case of non-immediate addressing, and thus, in the case of the GETFIELD example, may be irrelevant. Parameter 528 corresponds to bits 11:4. In the case that bit 23 of parameter 522 indicates that immediate addressing is to be used, bits 11:4 are used as an immediate increment to the base address provided in the register indicated by bits 22:20 of parameter 522. However, in the case that bit 23 of parameter 522 indicates that immediate addressing is not to be used, bits 11:4 are used as a post-increment to the auxiliary addressing register indicated in bits 14:12 of parameter 526. In the GETFIELD example, bits 11:4 are written with the intermediate parameter.

Figure 6:
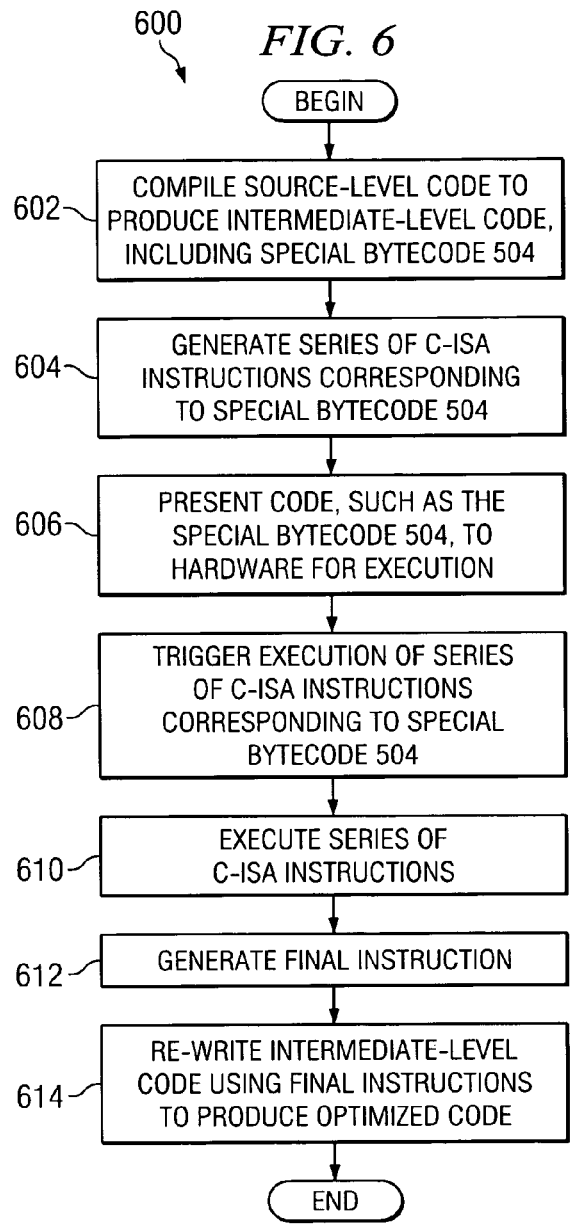
FIG. 6 shows a flow chart describing a method with which the techniques described herein may be implemented, in accordance with embodiments of the invention.

FIG. 6 shows a flow diagram describing a process 600 that may be used to implement embodiments described above. The process 600 may begin with the compiler 111 of FIG. 1 compiling un-optimized source-level code into optimized, intermediate-level code (block 602). In alternative embodiments, the compiler 111 may compile directly to a final executable code. In the illustrative case of a Java environment, compiling the source-level code comprises incorporating the special Bytecode 504 into the optimized, intermediate-level code, thus producing optimized, intermediate-level code such as that shown in FIG. 5b. The process 600 then comprises generating a series of C-ISA instructions (i.e., a micro-sequence) that correspond to the special Bytecode 504 (block 604). The series of C-ISA instructions may be generated in any of a variety of ways. The series of C-ISA instructions thus may be generated contemporaneously with compiling, or the series of C-ISA instructions may be generated by a programmer far in advance (e.g., months in advance) of compilation.

Regardless of the manner in which the series of C-ISA instructions is generated or otherwise obtained, the process 600 further comprises presenting code, particularly the special Bytecode 504, to hardware (e.g., the decode logic 152) for execution (block 606). Presenting the special Bytecode 504 to the hardware triggers execution of the series of C-ISA instructions corresponding to the special Bytecode 504 (block 608). Accordingly, the process 600 comprises executing the series of C-ISA instructions (block 610), thereby producing a final instruction (e.g., parameter) (block 612) that is used to re-generate the optimized, intermediate-level code to produce optimized, final code 514 (e.g., a re-generated instruction) (block 614), such as that shown in FIG. 5c.

Figure 7:
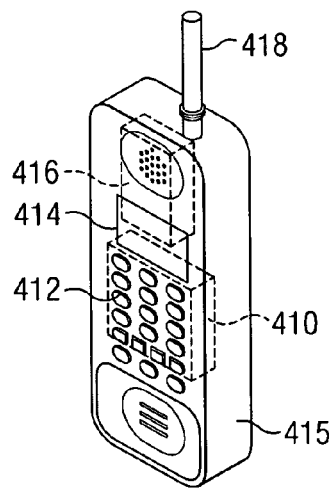
FIG. 7 shows an illustrative embodiment of the system described herein, in accordance with embodiments of the invention

System 100 may be implemented as a mobile cell phone 415 such as that shown in FIG. 7. As shown, the battery-operated, mobile communication device includes an integrated keypad 412 and display 414. The JSM processor 102 and MPU processor 104 and other components may be included in electronics package 410 coupled to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

Figure 8A:
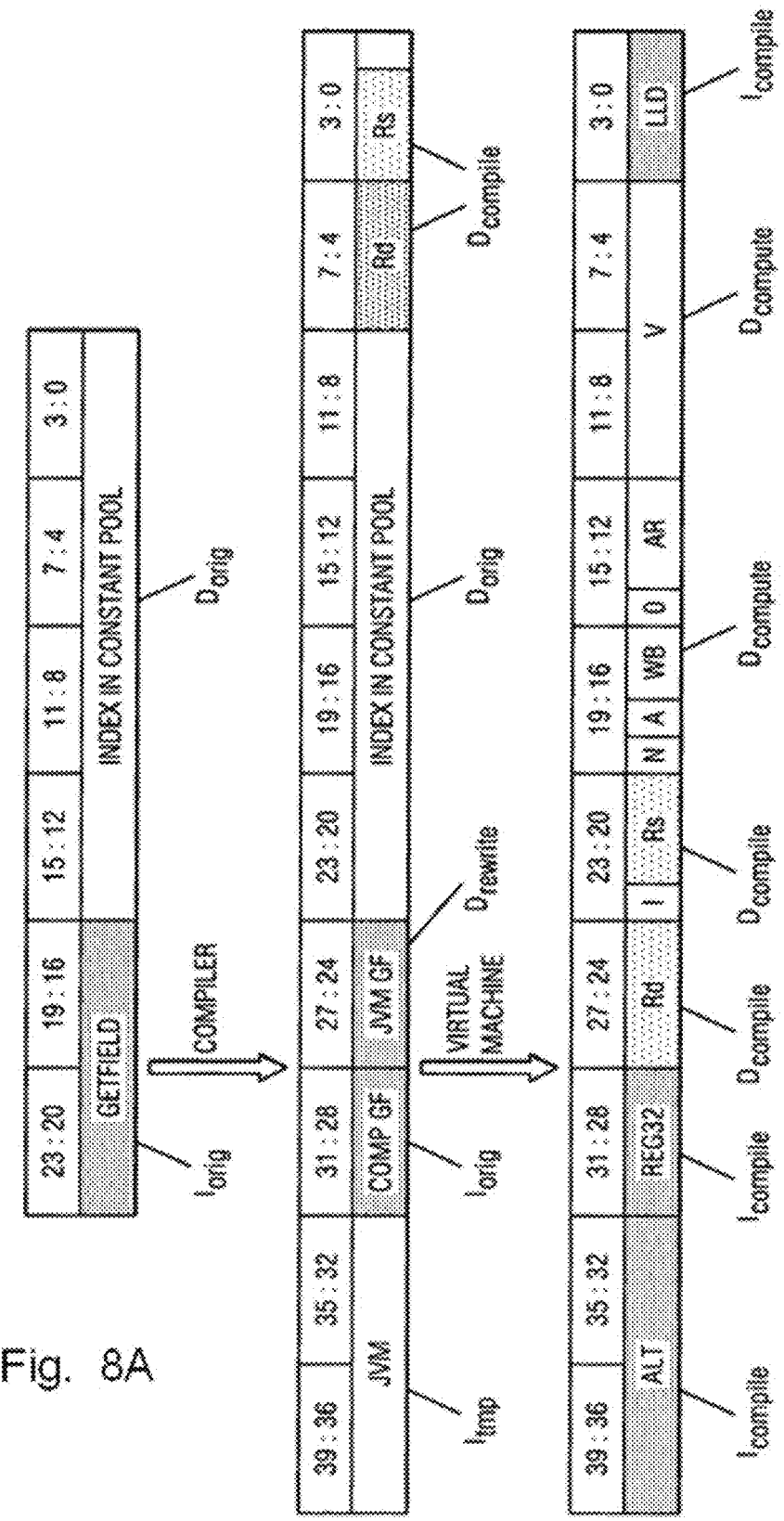
FIGS. 8A and 8B show various stages of code compilation and optimization, in accordance with embodiments of the invention.
Figure 8B:
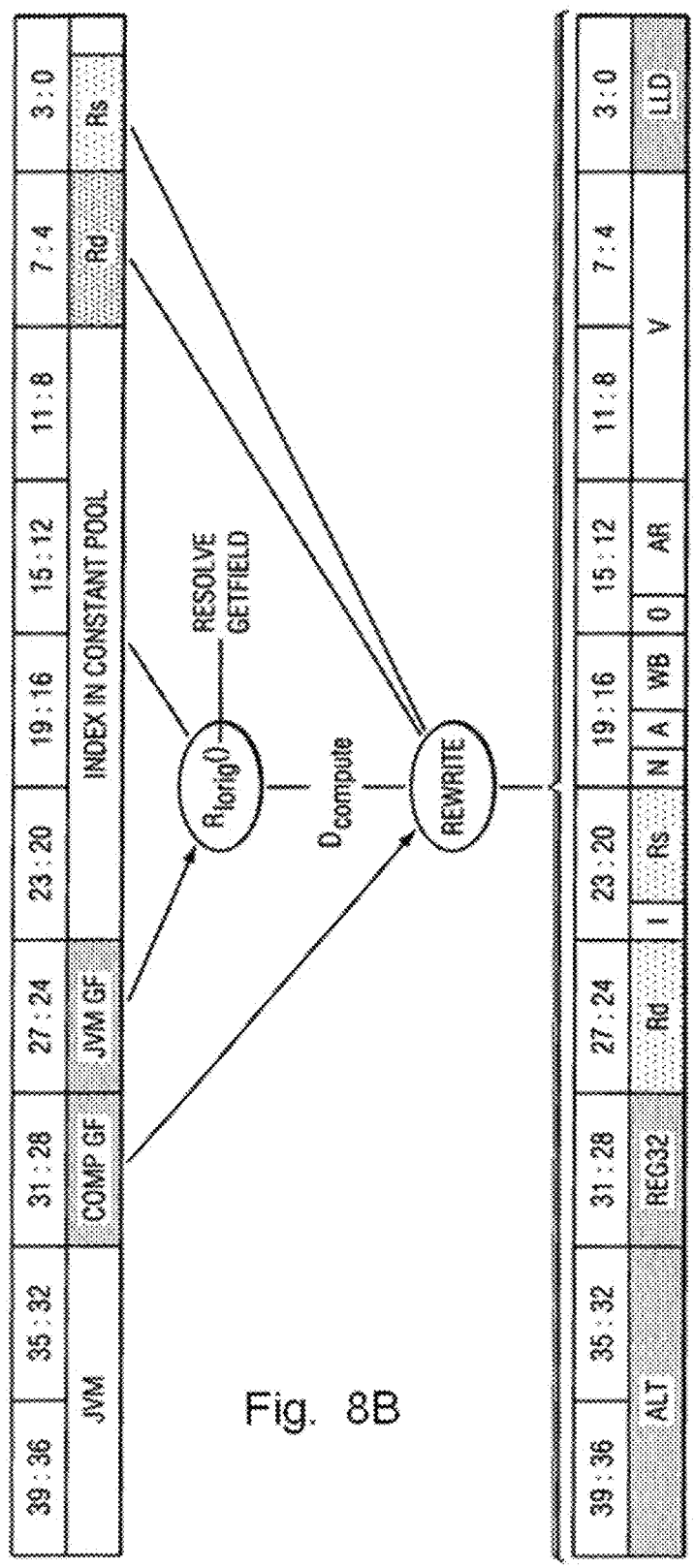

Reference is made to FIGS. 8A and 8B. In a Java runtime, or any runtime with an intermediate code, an on-line compiler (like Ahead-in-time Compiler or Dynamic Adaptive Compiler) needs some information to perform special optimizations, especially to rewrite intermediate code into native code. But, this information is the responsibility of another part of the runtime, most of the time a VM. A simple API or common data structure between compiler and VM could be sufficient. But within a runtime which support dynamic linking at first use, like in most of Java runtime, these information are not ready at the right moment, for example during a Ahead-in-time compilation. So, the compiler cannot do the optimization.

Our solution relies on a new instruction allowing the compiler to emit optimized code despite of information not known at this time. When this new instruction is executed, it gets missing data and rewrites itself to the final optimized instruction(s).

For comprehension, here follow some definitions: 1) In the intermediate code, there is an instruction $I_{orig}$. 2) $I_{orig}$ contains information $D_{orig}$ to perform its semantic. 3) The compiler, in order to optimize $I_{orig}$, need processed information $D_{compute}$ from the runtime and information $D_{compile}$ from the compiler itself. 4) The runtime compute $D_{compute}$ by applying a function $R_{Iorig}()$ with $D_{orig}$. 5) $I_{compile}$ is the instruction, or a sequence of instructions, which replace $I_{orig}$ in the optimize code.

As an example, if we consider the optimization of the Java opcode GETFIELD into a single native instruction LD (load from memory), $I_{orig}$ is the Java opcode GETFIELD, $D_{orig}$, the index in the Java constant pool (as defined by the Java Virtual Machine Specification), the function $R_{Iorig}()$ a function which resolve symbolic reference to a field into numeric information, $D_{compute}$ the offset at which the field is placed into the object layout, $I_{compile}$ the LD instruction, $D_{compile}$ register numbers of the source and the destination of the LD instruction.

Our solution relies on an instruction $I_{tmp}$ in the intermediate code. With this instruction, the compiler can generate an optimized code without knowing information $D_{compute}$. For that, the new instruction contains: 1) $I_{orig}$, or a derived form, which point, directly or indirectly, to the right $R_{Iorig}()$ for this instruction. 2) $D_{orig}$, or a derived form, to compute $D_{compute}$ by the runtime. 3) $D_{compile}$ which contains compiler information like register numbers. 4) $D_{rewrite}$ which point, directly or indirectly, to a pattern or a function to correctly rewrite this instruction $I_{tmp}$ into the final native instruction $I_{compile}$. When the compiler needs to generate an optimized code to replace $I_{orig}$ but do not have some information yet, it generate the instruction $I_{tmp}$ describe above instead of the $I_{compile}$. When the Java runtime (VM or processor) execute this instruction $I_{tmp}$, it decodes the instruction and executes four steps: 1) With $I_{orig}$, it find the right $R_{Iorig}()$ 2) With $D_{orig}$, it applied the runtime transformation $R_{Iorig}(D_{orig})$ and obtains $D_{comput}$. 3) With $D_{rewrite}$, it locate a process to obtain the final instruction(s) $I_{compile}$, by applying a function $F_{Drewrite}(D_{rewrite}, D_{compiler}, D_{compute})$. 4) It replace the instruction $I_{tmp}$ with the final instruction(s) $I_{compile}$ obtain in step 3. It is not necessary, but greatly recommended, that the length of the instruction $I_{tmp}$ is lower or equal to the length of the instruction(s) $I_{compile}$ to avoid code relocation during execution of $I_{tmp}$.

In other solutions, compiler must (i) partially optimize code, (ii) emit a function call which rewrite $I_{orig}$ or (iii) apply $R_{Iorig}()$ function earlier. Solution (i) disallows full optimization. Solution (ii) must manage a memory to store $I_{orig}$, $D_{orig}$ and $D_{compile}$ (allocation and de-allocation) whereas our solution store all this information in the new instruction $I_{tmp}$ and so do not require costly management. Solution (iii) could implied useless and costly (time and energy consumption) operations like class loading and initializing. Solution (iii) is especially inadequate in Ahead-in-time compiler technology, but could be inappropriate in other compiler technology. The compiler is able to fully optimize all part of code, despite that some information are not available. The compiler support is very easy because emitting instruction is a very common operation for it. In addition, emitting this new instruction is the same complexity as emitting the final instruction if all information would be available. The compiler could easily manage this new instruction like a real instruction in order to use it in input code, allowing multi-pass compiler, or multi compilers to work transparently with this technology (for example an Ahead-in-time compiler with a Dynamic Adaptive Compiler). The support in the runtime or VM is only the support of a new virtual instruction. Because the mechanism relies on a new instruction, it is possible to limit at the strict minimum the number of cases when a code relocation during execution is necessary. Because all data specific to an instance of this instruction ($I_{orig}$, $D_{orig}$ and $D_{compile}$) is contained in the instruction itself, there is no need to manage memory allocation and de-allocation for these data. Only permanent data is stored outside the instruction (data pointed, directly or indirectly, by $D_{rewrite}$) and so do not require memory management.

What is claimed is:

1. A system, comprising:
    a processor; and
    a compiler configured to execute on the processor to compile Java source code for execution on the processor, wherein the compiler generates a sing intermediate instruction optimizable to a single native instruction at runtime and replaces the single intermediate instruction with a single native rewrite instruction comprising a rewrite operation code,
    wherein execution of the single native rewrite instruction by the processor rewrites the single native rewrite instruction into the single native instruction, and
    wherein the single intermediate instruction comprises an operation code of a first instruction set type of the processor, and the single native rewrite instruction is an instruction in a second instruction set type of the processor.

2. The system of claim 1, wherein execution of the single native rewrite instruction comprises selection of a series of instructions based on the rewrite operation code, wherein execution of the series of instructions rewrites the single native rewrite instruction into the single native instruction.

3. The system of claim 2, wherein the rewrite operation code corresponds to an entry in a data structure used by decode logic of the processor, the entry comprising a reference to a storage address of the series of instructions.

4. The system of claim 2, further comprising a virtual machine coupled to the processor, wherein the series of instructions is generated by the virtual machine and stored in memory.

5. The system of claim 1, wherein the single native rewrite instruction further comprises a parameter of the single intermediate instruction, a pointer to a computation function configured to transform the parameter into at least one parameter of the single native instruction, and a pointer to a rewrite function configured to rewrite the single native rewrite instruction into the single native instruction using the at least one parameter.

6. The system of claim 5, wherein the single native rewrite instruction further comprises register numbers of source and destination registers of the single native instruction and wherein the rewrite function is further configured to rewrite the single native rewrite instruction using the register numbers.

7. The system of claim 1, wherein the single native instruction has a length less than or equal to that of the single native rewrite instruction.

8. A processor, comprising:
    a fetch logic configured to fetch from storage compiled Java code comprising a single native rewrite instruction that replaced a single intermediate instruction optimizable to a single native instruction at runtime during compilation, wherein the single native rewrite instruction comprises a rewrite operation code;
    a decade logic coupled to the fetch logic and configured to decode the compiled code,
    wherein, upon decoding the rewrite operation code, the decode logic causes execution of the single native rewrite instruction by the processor to rewrite the single native rewrite instruction into the single native instruction, and
    wherein, the single intermediate instruction comprises an operation code of a first instruction set type of the processor, and the single native rewrite instruction is an instruction in a second instruction set type of the processor.

9. The processor of claim 8, further comprising a vector table having an entry corresponding to the single native rewrite instruction and comprising a reference to a location of a group of instructions in a memory, and wherein the decode logic causes execution by using the rewrite operation code to locate the entry and executing the group of instructions.

10. The processor of claim 9, wherein a virtual machine executing on the processor is configured to generate the group of instructions and store the group of instructions in the memory.

11. The processor of claim 8, wherein the single native rewrite instruction further comprises a parameter of the single intermediate instruction, a pointer to a computation function configured to transform the parameter into at least one parameter of the single native instruction, and a pointer to a rewrite function configured to rewrite the single native rewrite instruction into the single native instruction using the at least one parameter.

12. The processor of claim 11, wherein the single native rewrite instruction further comprises register numbers of source and destination registers of the single native instruction and wherein the rewrite function is further configured to rewrite the single native rewrite instruction using the register numbers.

13. A computer-implemented method, comprising:
    compiling source-level Java code to generate a single intermediate instruction, wherein the single intermediate instruction is optimizable to a single native instruction at runtime; and
    replacing the single intermediate instruction with a single native rewrite instruction comprising a rewrite operation code, wherein execution of the single native rewrite instruction by a processor rewrites the single native rewrite instruction into the single native instruction, and wherein the single intermediate instruction comprises an operation code of a first instruction set type of the processor, and the single native rewrite instruction is an instruction in a second instruction set type of the processor.

14. The method of claim 13, wherein the single native rewrite instruction further comprises a parameter of the single intermediate instruction, a pointer to a computation function configured to transform the parameter into at least one parameter of the single native instruction, and a pointer to a rewrite function configured to rewrite the single native rewrite instruction into the single native instruction using the at least one parameter.

15. The method of claim 13, wherein the single native instruction has a length less than or equal to that of the single native rewrite instruction.

16. A computer-implemented method, comprising: decoding a single native rewrite instruction comprised in compiled Java code, wherein the single native rewrite instruction comprises a rewrite operation code and wherein, during compilation, the single native rewrite instruction replaced a single intermediate instruction optimizable to a single native instruction at runtime; and responsive to the decoding, executing the single native rewrite instruction on a processor to rewrite the single native rewrite instruction into the single native instruction, wherein the single intermediate instruction comprises an operation code of a first instruction set type of the processor, and the single native rewrite instruction is an instruction in a second instruction set type of the processor.

17. The computer-implemented method of claim 16, wherein executing the single native rewrite instruction comprises selecting a sequence of instructions using the rewrite operation code to locate an entry in a vector table, wherein the entry comprises a reference to the sequence of instructions.

18. The computer-implemented method of claim 16, wherein executing the single native rewrite instruction comprises executing a computation function referenced in the single native rewrite instruction to transform a parameter of the single intermediate instruction comprised in the single native rewrite instruction into at least one parameter of the single native instruction.

19. The computer-implemented method of claim 16, wherein executing the single native rewrite instruction comprises executing a rewrite function referenced in the single native rewrite instruction to rewrite the single native rewrite instruction into the single native instruction.

* * * * *